United States Patent
Lien et al.

(10) Patent No.: US 9,606,943 B2
(45) Date of Patent: Mar. 28, 2017

(54) EXTERNAL STORAGE DEVICE WITH TWO INTERFACES

(71) Applicant: Transcend Information, Inc., Taipei (TW)

(72) Inventors: Li-Min Lien, Hsinchu County (TW); Ren-Wei Chen, New Taipei (TW)

(73) Assignee: Transcend Information, Inc., Taipei (TW)

( * ) Notice: Subject to any disclaimer, the term of this patent is extended or adjusted under 35 U.S.C. 154(b) by 374 days.

(21) Appl. No.: 14/304,980

(22) Filed: Jun. 15, 2014

(65) Prior Publication Data
US 2015/0363341 A1    Dec. 17, 2015

(51) Int. Cl.
*G06F 13/24*  (2006.01)
*G06F 13/16*  (2006.01)
*G06F 13/40*  (2006.01)
*G06F 13/38*  (2006.01)

(52) U.S. Cl.
CPC ...... *G06F 13/1668* (2013.01); *G06F 13/1694* (2013.01); *G06F 13/385* (2013.01); *G06F 13/4022* (2013.01)

(58) Field of Classification Search
CPC . G06F 13/1668; G06F 13/385; G06F 13/4022
See application file for complete search history.

(56) References Cited

U.S. PATENT DOCUMENTS

| | | | |
|---|---|---|---|
| 7,660,938 B1 | 2/2010 | Chow | |
| 2003/0099147 A1* | 5/2003 | Deng | G06F 3/0607 365/230.05 |
| 2004/0015631 A1* | 1/2004 | Kwong | H01R 13/703 710/302 |
| 2007/0300006 A1* | 12/2007 | Lin | G06F 13/385 710/315 |
| 2009/0150515 A1* | 6/2009 | Kung | G06F 1/3203 709/217 |
| 2010/0199000 A1* | 8/2010 | Huang | G06F 13/1663 710/33 |

(Continued)

FOREIGN PATENT DOCUMENTS

TW    I414942    11/2013

*Primary Examiner* — Jing-Yih Shyu
(74) *Attorney, Agent, or Firm* — Winston Hsu; Scott Margo

(57) ABSTRACT

An external storage device includes a memory, a controller, a first interface, a second interface, a first switching module, and a second switching module. The controller is coupled to the memory. The first interface is used to connect to a first electronic device. The second interface used to connect to a second electronic device. The first switching module is coupled to the controller, the first interface, and the second interface. The second switching module is coupled to the controller, the first interface, the second interface, and the first switching module. When the first interface is electrically connected to a first electronic device and the second interface is electrically connected to the second electronic device, the first electronic device charges the controller and the second electronic device through the first switching module, and the first electronic device accesses the memory through the second switching module and the controller.

20 Claims, 10 Drawing Sheets

(56) References Cited

U.S. PATENT DOCUMENTS

2014/0040511 A1* 2/2014 Tan .................... G06F 3/061
　　　　　　　　　　　　　　　　　　　　710/14
2015/0039933 A1* 2/2015 Chen ................ G06F 11/1048
　　　　　　　　　　　　　　　　　　　　714/6.3

* cited by examiner

EXTERNAL STORAGE DEVICE WITH TWO INTERFACES

BACKGROUND

1. Technical Field

The present invention relates to an external storage device, and particularly to an external storage device that has two different type interfaces, and when the two different type interfaces are simultaneously electrically connected to a first electronic device and a second electronic device respectively, the first electronic device, the second electronic device, and the external storage device can still operate normally.

2. Description of the Conventional Art

Currently, consumer electronic products with two different type interfaces become more and more popular. Generally speaking, the consumer electronic products only can utilize one interface of the two different type interfaces to electrically connect to an electronic device, or the other interface of the two different type interfaces to electrically connect to another electronic device. That is to say, the consumer electronic products cannot simultaneously utilize the two different type interfaces to electrically connect to two electronic devices. If the consumer electronic products simultaneously utilize the two different type interfaces to electrically connect to the two electronic devices, the two electronic devices and the consumer electronic products may operate abnormally. Therefore, the consumer electronic products provided by the prior art are inconveniently and unfriendly for a user.

SUMMARY

An embodiment provides an external storage device. The external storage device includes a memory, a controller, a first interface, a second interface, a first switching module, and a second switching module. The controller is coupled to the memory. The first interface is used to connect to a first electronic device. The second interface used to connect to a second electronic device. The first switching module is coupled to the controller, the first interface, and the second interface. The second switching module is coupled to the controller, the first interface, the second interface, and the first switching module. When the first interface is electrically connected to a first electronic device and the second interface is electrically connected to the second electronic device, the first electronic device charges the controller and the second electronic device through the first switching module, and the first electronic device accesses the memory through the second switching module and the controller.

Another embodiment provides an external storage device. The external storage device includes a memory, a controller, a first interface, a second interface, a first switching module, and a second switching module. The controller is coupled to the memory. The first interface is used to connect to a first electronic device. The second interface used to connect to a second electronic device. The first switching module is coupled to the controller, the first interface, and the second interface. The second switching module is coupled to the controller, the first interface, the second interface, and the first switching module. When the first interface is electrically connected to the first electronic device and the second interface is electrically connected to the second electronic device, the first electronic device charges the second electronic device through the first switching module, and the first electronic device accesses the second electronic device through the second switching module.

The present invention provides an external storage device. Compared to the prior art, the external storage device has advantages as follows: first, when a first interface of the external storage device is electrically connected to a first electronic device and a second interface of the external storage device is electrically connected to a second electronic device, the first electronic device can access the external storage device or the second electronic device; second, when the first interface of the external storage device is electrically connected to the first electronic device and the second interface of the external storage device is electrically connected to the second electronic device, the first electronic device can charge the second electronic device regardless of the first electronic device accessing the external storage device or the second electronic device; third, the first electronic device does not need an additional cable when the first electronic device charges the second electronic device; and fourth, consumer products with two different type interfaces for the first electronic device and the second electronic device become more and more in the future, so the external storage device can be applied to the consumer products with two different type interfaces.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
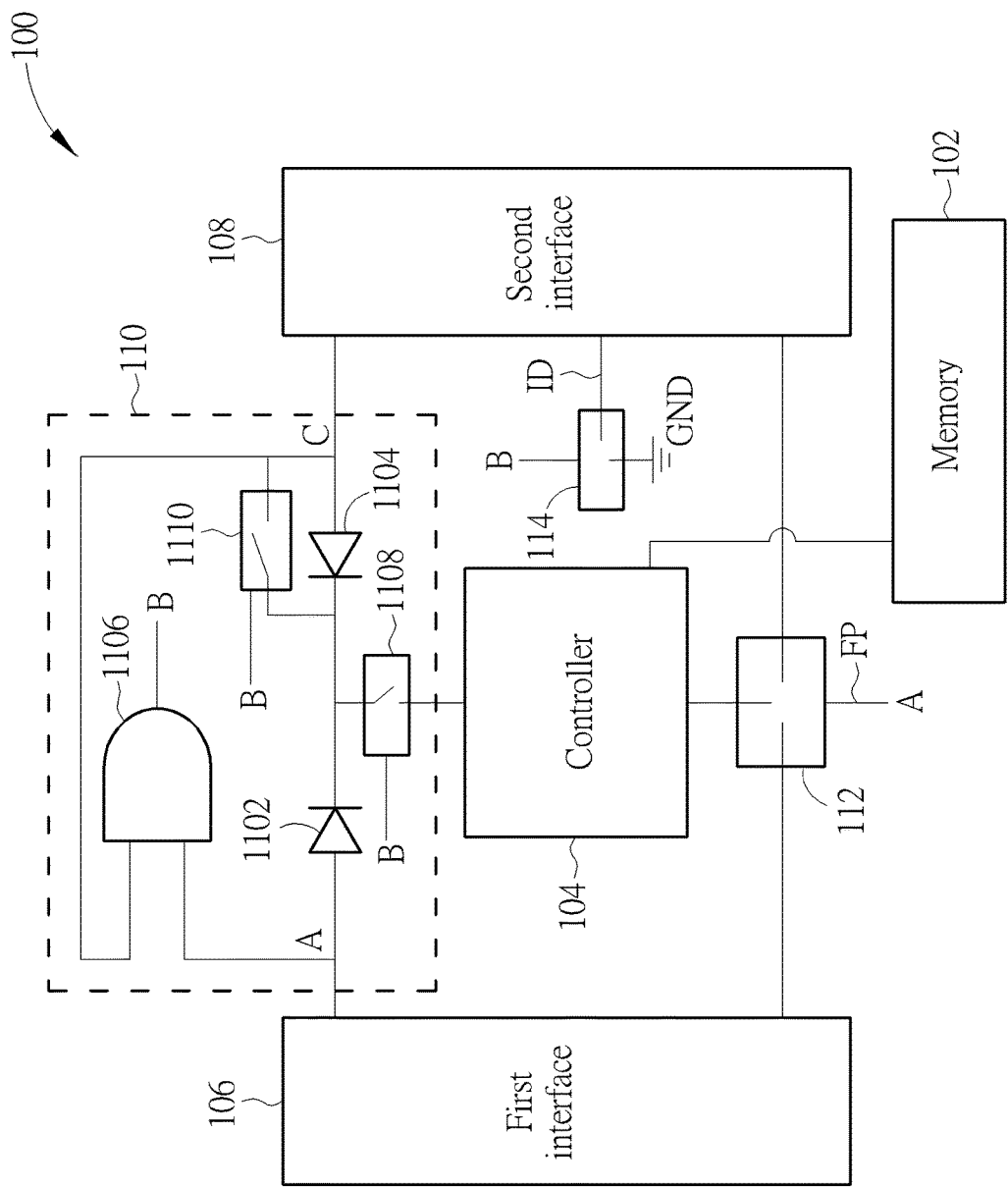
FIG. 1 is a diagram illustrating an external storage device according to an embodiment.

Please refer to FIG. 1. FIG. 1 is a diagram illustrating an external storage device 100 according to an embodiment. The external storage device 100 includes a memory 102, a controller 104, a first interface 106, a second interface 108, a first switching module 110, a second switching module 112, and a third switching module 114, wherein the memory 102 can be a flash memory and the first interface 106 can be a normal Universal Serial Bus (USB) interface and the second interface 108 can be a micro-USB interface. As shown in FIG. 1, the controller 104 is coupled to the memory 102. The first switching module 110 is coupled to the controller 104, the first interface 106, and the second interface 108. The second switching module 112 comprises a first terminal coupled to the controller 104, a second terminal coupled to the first interface 106, and a third terminal coupled to the second interface 108, and a first pin FP coupled to the first switching module 110, wherein the second switching module 112 is coupled to the first switching module 110 and the first interface 106 through the first pin FP. The third switching module 114 is coupled to a predetermined pin ID of the second interface 108, and the first switching module 110. As shown in FIG. 1, the first switching module 110 includes a first diode 1102, a second diode 1104, a AND gate 1106, a first switching unit 1108, and a second switching unit 1110. The first diode 1102 has an anode coupled to the first interface 106 and the first pin FP of the second switching module 112, and a cathode, wherein the first pin FP of the second switching module 112 is used for receiving a signal A of the anode of the first diode 1102. The second diode 1104 has an anode coupled to the second interface 108, and a cathode coupled to the cathode of the first diode 1102. The AND gate 1106 has a first input terminal coupled to the anode of the first diode 1102, a second input terminal coupled to the anode of the second diode 1104, and an output terminal. The first switching unit 1108 has a first terminal coupled to the cathode of the first diode 1102, a control terminal coupled to the output terminal of the AND gate 1106 for receiving an output signal B of the output terminal of the AND gate 1106, and a second terminal coupled to the controller 104. The second switching unit 1110 has a first terminal coupled to the cathode of the second diode 1104, a second terminal coupled to the anode of the second diode 1104, and a control terminal coupled to the output terminal of the AND gate 1106 for receiving the output signal B of the output terminal of the AND gate 1106.

Figure 2:
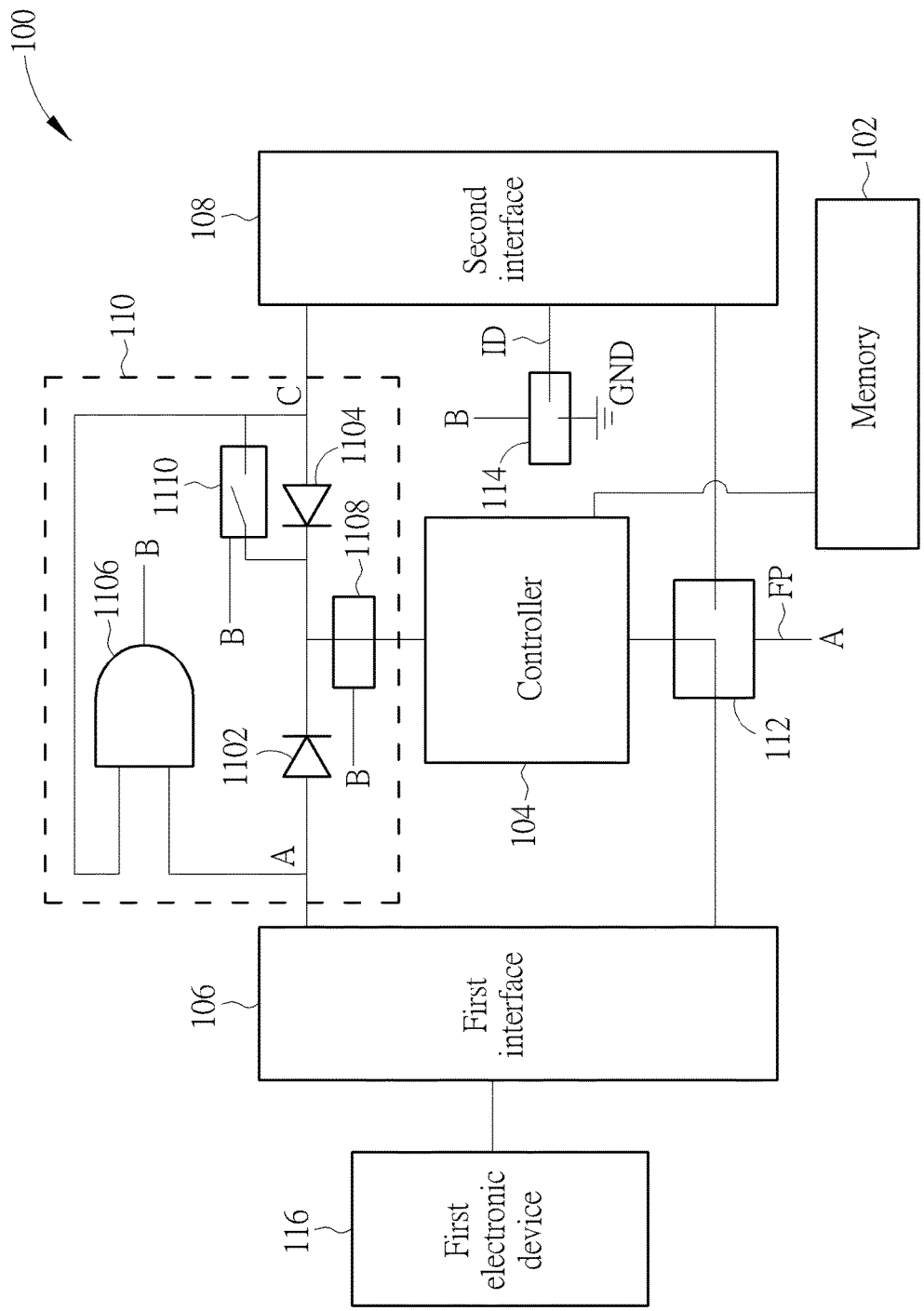
FIG. 2 is a diagram illustrating the first interface of the external storage device being electrically connected to the first electronic device.

Please refer to FIG. 2. FIG. 2 is a diagram illustrating the first interface 106 of the external storage device 100 being electrically connected to a first electronic device 116, wherein the first electronic device 116 can be a personal computer or a host that provides power. As shown in FIG. 2, when the first interface 106 is electrically connected to the first electronic device 116 and the second interface 108 is not electrically connected to anything, the signal A of the anode of the first diode 1102 is high and a signal C of the anode of the second diode 1104 is low, so the output signal B of the output terminal of the AND gate 1106 is low. Meanwhile, the second interface 108 is not electrically connected to anything, so the predetermined pin ID of the second interface 108 is floating according to the output signal B of the output terminal of the AND gate 1106. But, the present invention is not limited to the signal A being high and the signal C being low when the first interface 106 is electrically connected to the first electronic device 116 and the second interface 108 is not electrically connected to anything. Because the output signal B of the output terminal of the AND gate 1106 is low, the first terminal of the first switching unit 1108 is electrically connected to the second terminal of the first switching unit 1108 and the first terminal of the second switching unit 1110 is disconnected to the second terminal of the second switching unit 1110 according to the output signal B of the output terminal of the AND gate 1106. Because the first terminal of the first switching unit 1108 is electrically connected to the second terminal of the first switching unit 1108, the first electronic device 116 can charge the controller 104 through the first diode 1102 and the first switching unit 1108 of the first switching module 110. In addition, because the first electronic device 116 charges the controller 104, and the first terminal of the second switching module 112 is connected to the second terminal of the second switching module 112 according to the signal A of the anode of the first diode 1102, the first electronic device 116 can access the memory 102 through the second switching module 112 and the controller 104. Therefore, as shown in FIG. 2, when the first interface 106 is electrically connected to the first electronic device 116 and the second interface 108 is not electrically connected to anything, the external storage device 100 is to be a storage device of the first electronic device 116.

Figure 3:
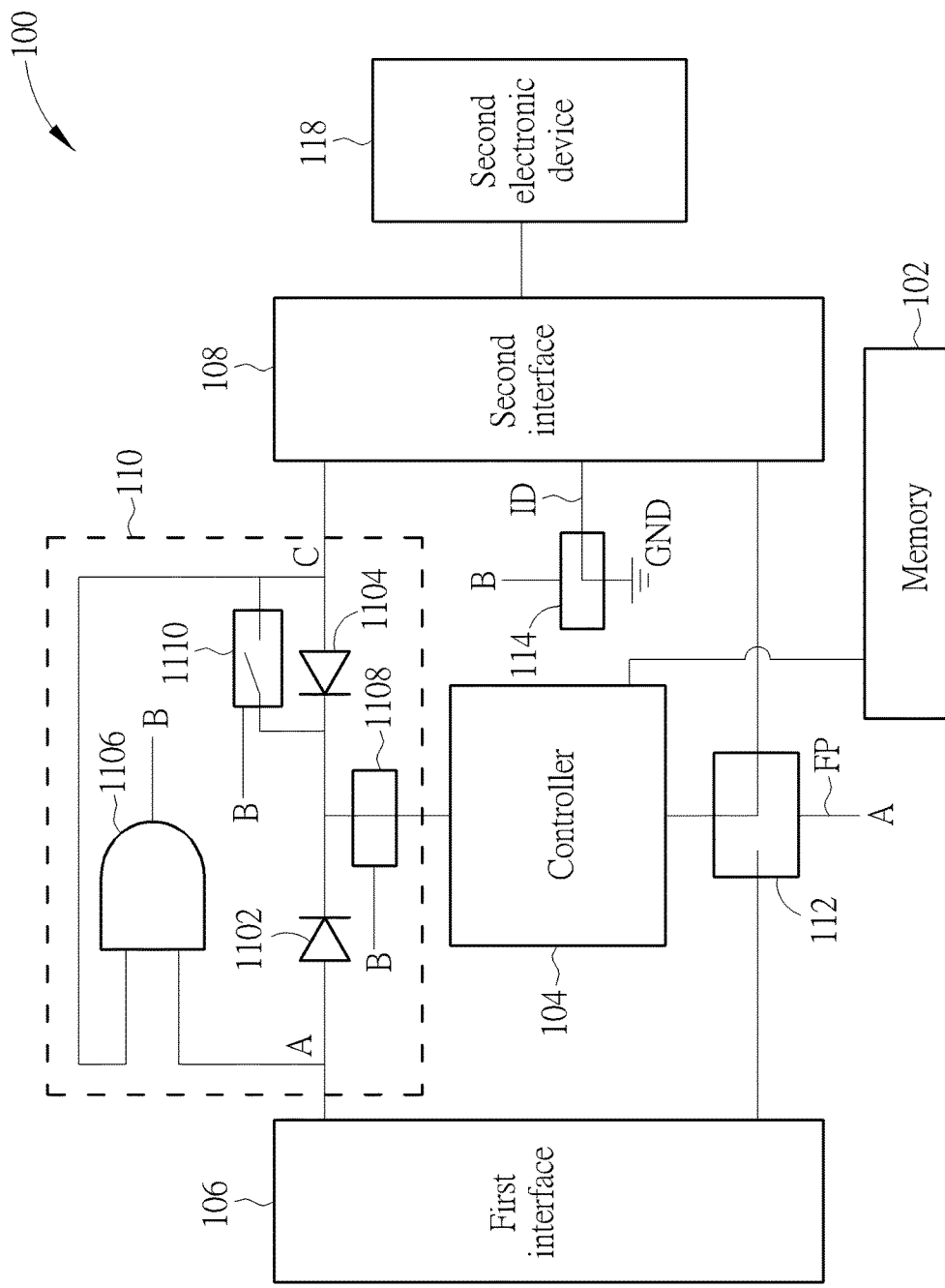
FIG. 3 is a diagram illustrating the second interface of the external storage device being electrically connected to the second electronic device.

Please refer to FIG. 3. FIG. 3 is a diagram illustrating the second interface 108 of the external storage device 100 being electrically connected to a second electronic device 118, wherein the second electronic device 118 can be a hand-held device or a portable device. As shown in FIG. 3, when the second interface 108 is electrically connected to the second electronic device 118 and the first interface 106 is not electrically connected to anything, the signal A of the anode of the first diode 1102 is low and the signal C of the anode of the second diode 1104 is high, so the output signal B of the output terminal of the AND gate 1106 is low. Meanwhile, the first interface 106 is not electrically connected to anything, so the third switching module 114 connects to the predetermined pin ID of the second interface 108 to ground GND according to the output signal B of the output terminal of the AND gate 1106. But, the present invention is not limited to the signal A being low and the signal C being high when the second interface 108 is electrically connected to the second electronic device 118 and the first interface 106 is not electrically connected to anything. Because the output signal B of the output terminal of the AND gate 1106 is low, the first terminal of the first switching unit 1108 is electrically connected to the second terminal of the first switching unit 1108 and the first terminal of the second switching unit 1110 is disconnected to the second terminal of the second switching unit 1110 according to the output signal B of the output terminal of the AND gate 1106. Because the first terminal of the first switching unit 1108 is electrically connected to the second terminal of the first switching unit 1108, the second electronic device 118 can charge the controller 104 through the second diode 1104 and the first switching unit 1108 of the first switching module 110. In addition, because the second electronic device 118 charges the controller 104, and the first terminal of the second switching module 112 is connected to the third terminal of the second switching module 112 according to the signal A of the anode of the first diode 1102, the second electronic device 118 can access the memory 102 through the second switching module 112 and the controller 104. Therefore, as shown in FIG. 3, when the second interface 108 is electrically connected to the second electronic device 118 and the first interface 106 is not electrically connected to anything, the external storage device 100 is to be a storage device of the second electronic device 118. That is to say, when the second interface 108 is electrically connected to the second electronic device 118 and the first interface 106 is not electrically connected to anything, the third switching module 114 connects to the predetermined pin ID of the second interface 108 to the ground GND, so the second electronic device 118 is a host and the external storage device 100 is to be a storage device of the second electronic device 118.

Figure 4:
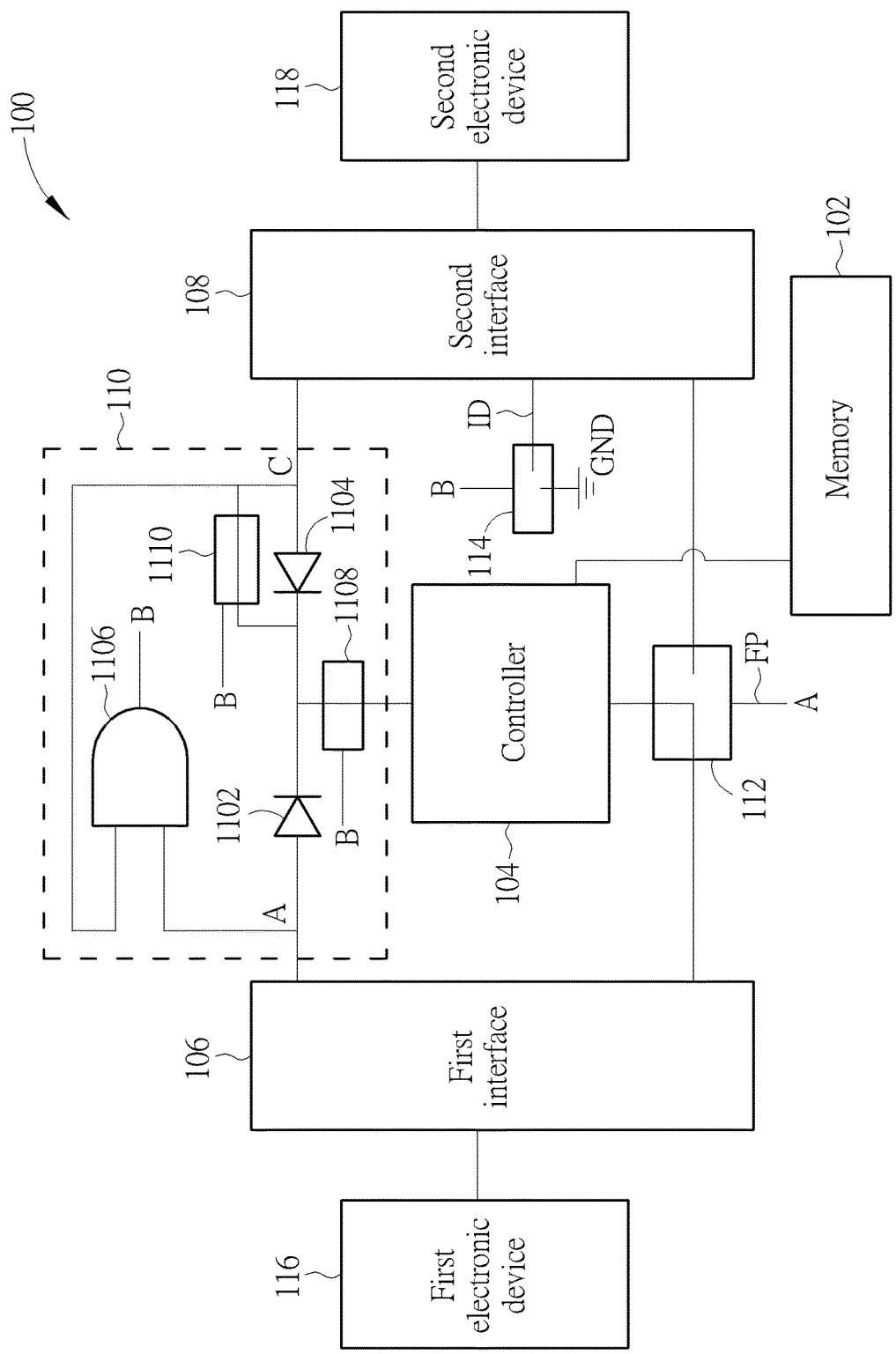
FIG. 4 is a diagram illustrating the first interface being electrically connected to the first electronic device and the second interface being electrically connected to the second electronic device.

Please refer to FIG. 4. FIG. 4 is a diagram illustrating the first interface 106 being electrically connected to the first electronic device 116 and the second interface 108 being electrically connected to the second electronic device 118. As shown in FIG. 4, when the first interface 106 is electrically connected to the first electronic device 116 and the second interface 108 is electrically connected to the second electronic device 118, the predetermined pin ID of the second interface 108 is floating according to the output signal B of the output terminal of the AND gate 1106, and the signal A of the anode of the first diode 1102 is high and the signal C of the anode of the second diode 1104 is high, resulting in the output signal B of the output terminal of the AND gate 1106 being high. Because the output signal B of the output terminal of the AND gate 1106 is high, the first terminal of the first switching unit 1108 is electrically connected to the second terminal of the first switching unit 1108 and the first terminal of the second switching unit 1110 is connected to the second terminal of the second switching unit 1110 according to the output signal B of the output terminal of the AND gate 1106. Because when the first interface 106 is electrically connected to the first electronic device 116 and the second interface 108 is electrically connected to the second electronic device 118, and the output signal B of the output terminal of the AND gate 1106 is high, the first switching unit 1108 is reset to ensure that the first electronic device 116 charges the controller 104 through the first diode 1102 and the first switching unit 1108, and charges the second electronic device 118 through the first diode 1102 and the second switching unit 1110. In addition, because the first electronic device 116 charges the controller 104, and the first terminal of the second switching module 112 is connected to the second terminal of the second switching module 112 according to the signal A of the anode of the first diode 1102, the first electronic device 116 can access the memory 102 through the second switching module 112 and the controller 104. Therefore, as shown in FIG. 4, when the first interface 106 is electrically connected to the first electronic device 116 and the second interface 108 is electrically connected to the second electronic device 118, the external storage device 100 is to be a storage device of the first electronic device 116, and the first electronic device 116 can charge the second electronic device 118.

Figure 5:
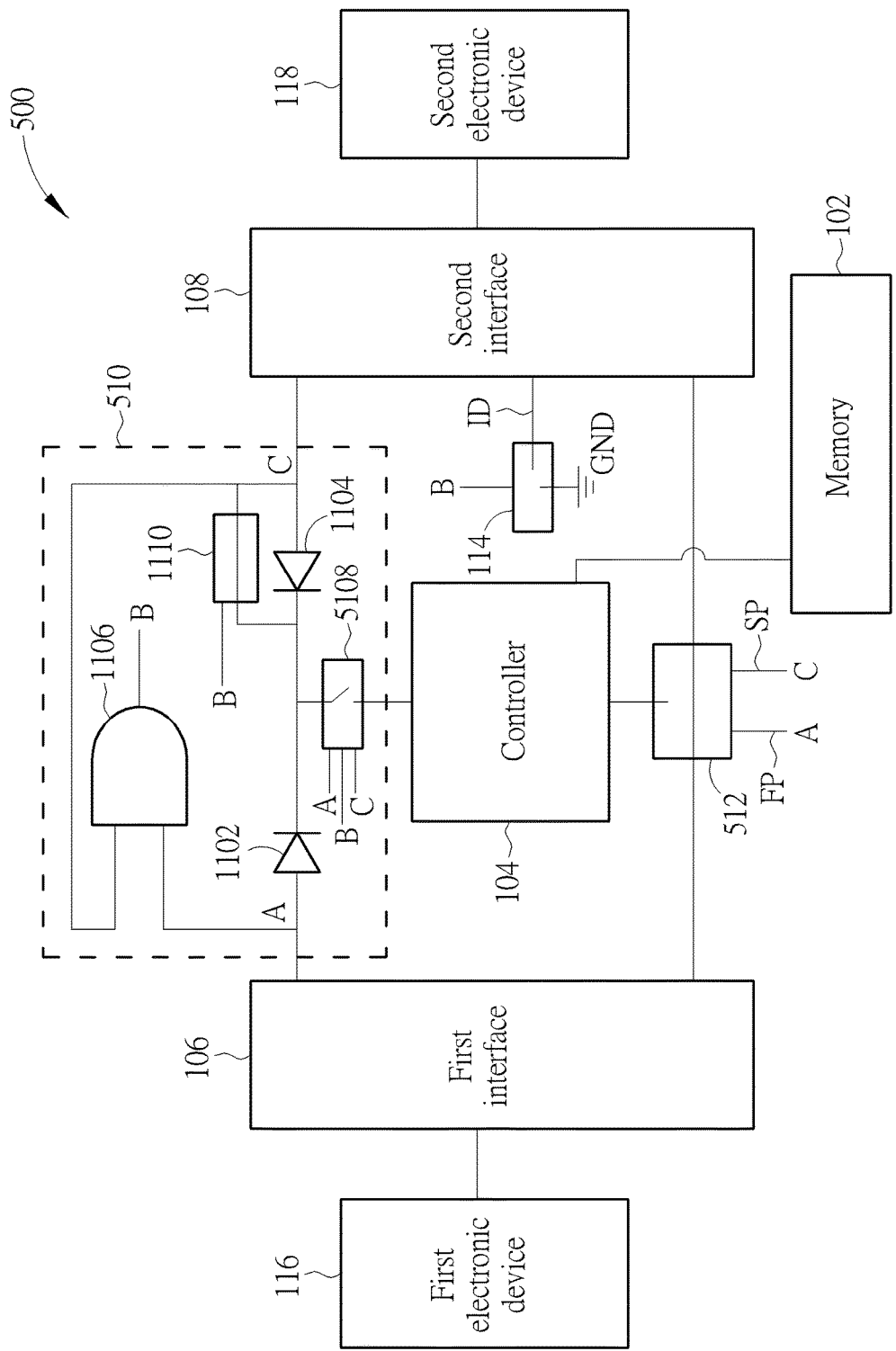
FIG. 5 is a diagram illustrating an external storage device according to another embodiment.

Please refer to FIG. 5. FIG. 5 is a diagram illustrating an external storage device 500 according to another embodiment. The external storage device 500 includes a memory 102, a controller 104, a first interface 106, a second interface 108, a first switching module 510, a second switching module 512, and a third switching module 114. As shown in FIG. 5, a difference between the external storage device 500 and the external storage device 100 is that a first switching unit 5108 of the first switching module 510 further includes a second control terminal and a third control terminal, and the second switching module 512 further includes a second pin SP, wherein the second control terminal of the first switching unit 5108 is coupled to the anode of the first diode 1102 for receiving a signal A of the anode of the first diode 1102, the third control terminal of the first switching unit 5108 is coupled to the anode of the second diode 1104 for receiving a signal C of the anode of the second diode 1104, and the second pin SP of the second switching module 512 is coupled to the anode of the second diode 1104 and the second interface 108, wherein the second pin SP of the second switching module 512 is used for receiving the signal C of the anode of the second diode 1104. As shown in FIG. 5, when the first interface 106 is electrically connected to the first electronic device 116 and the second interface 108 is electrically connected to the second electronic device 118, the first terminal of the first switching unit 5108 is disconnected to the second terminal of the first switching unit 5108 (so the first electronic device 116 cannot charge the controller 104) according to an output signal B of the output terminal of the AND gate 1106, the signal A of the anode of the first diode 1102, and the signal C of the anode of the second diode 1104 (that is, when the first interface 106 is electrically connected to the first electronic device 116 and the second interface 108 is electrically connected to the second electronic device 118, the output signal B, the signal A, and the signal C are all high, so the first terminal of the first switching unit 5108 is disconnected to the second terminal of the first switching unit 5108), and the first terminal of the second switching unit 1110 is electrically connected to the second terminal of the second switching unit 1110 according to the output signal B of the output terminal of the AND gate 1106, so that the first electronic device 116 can charge the second electronic device 118 through the second switching unit 1110 of the first switching module 510. On the other hand, since the fourth terminal of the second switch module 512 is connected to the fifth terminal of the second switch module 512 according to the signal A of the anode of the first diode 1102 and the signal C, so that the first electronic device 116 can access the second electronic device 118 through the second switching module 512. In addition, subsequent operational principles of the external storage device 500 are the same as those of the external storage device 100, so further description thereof is omitted for simplicity.

Figure 6:
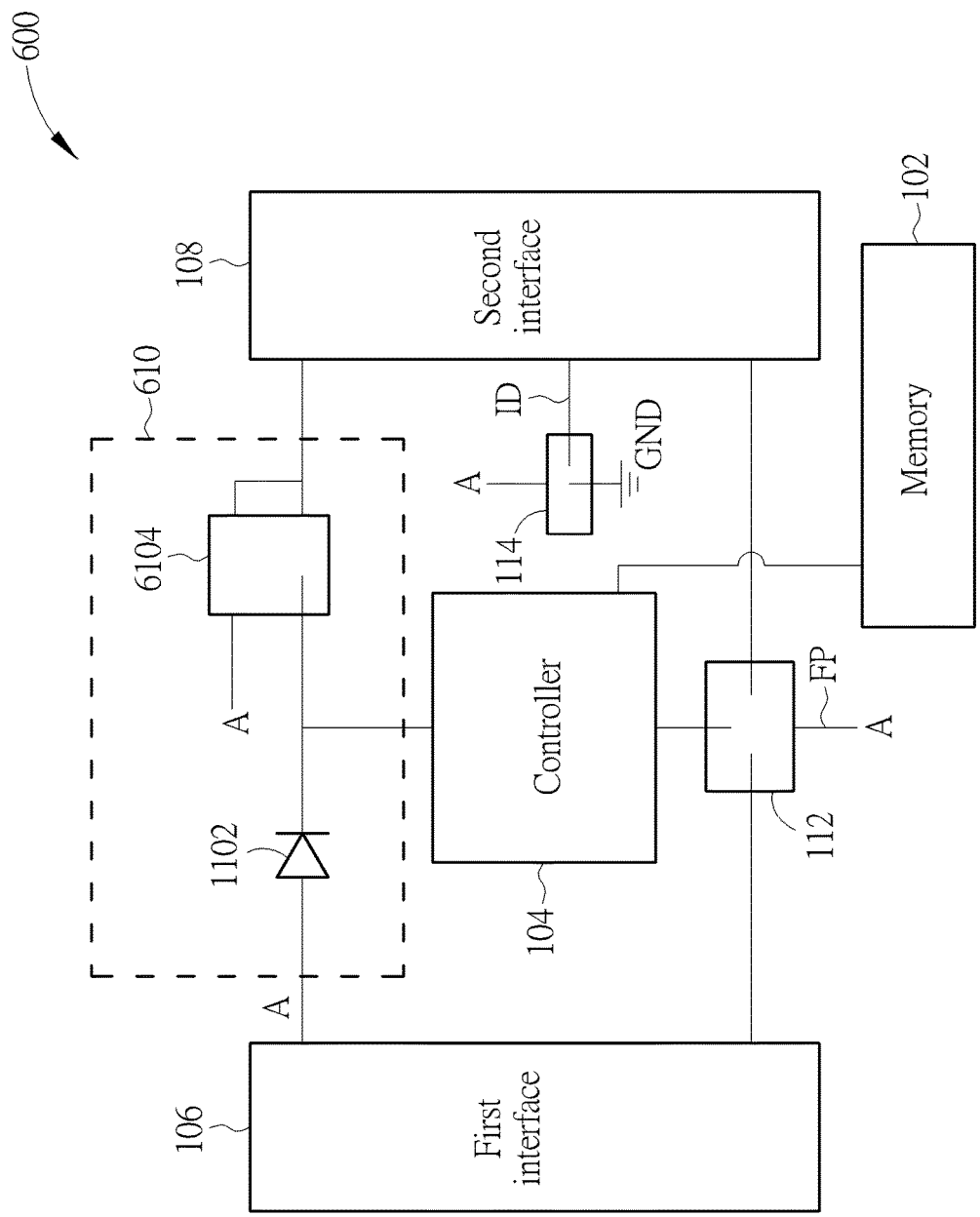
FIG. 6 is a diagram illustrating an external storage device according to another embodiment.

Please refer to FIG. 6. FIG. 6 is a diagram illustrating an external storage device 600 according to another embodiment. The external storage device 600 includes a memory 102, a controller 104, a first interface 106, a second interface 108, a first switching module 610, a second switching module 112, and a third switching module 114. As shown in FIG. 6, a difference between the external storage device 600 and the external storage device 100 is that the first switching module 610 includes a first diode 1102 and a third switching unit 6104. The first diode 1102 has an anode coupled to the first interface 106 and the first pin FP of the second switching module 112, and a cathode. The third switching unit 6104 has a first terminal coupled to the cathode of the first diode 1102, a control terminal coupled to the anode of the first diode 1102 for receiving a signal A of the anode of the first diode 1102, a second terminal coupled to the second interface 108, and a third terminal coupled to the second interface 108.

Figure 7:
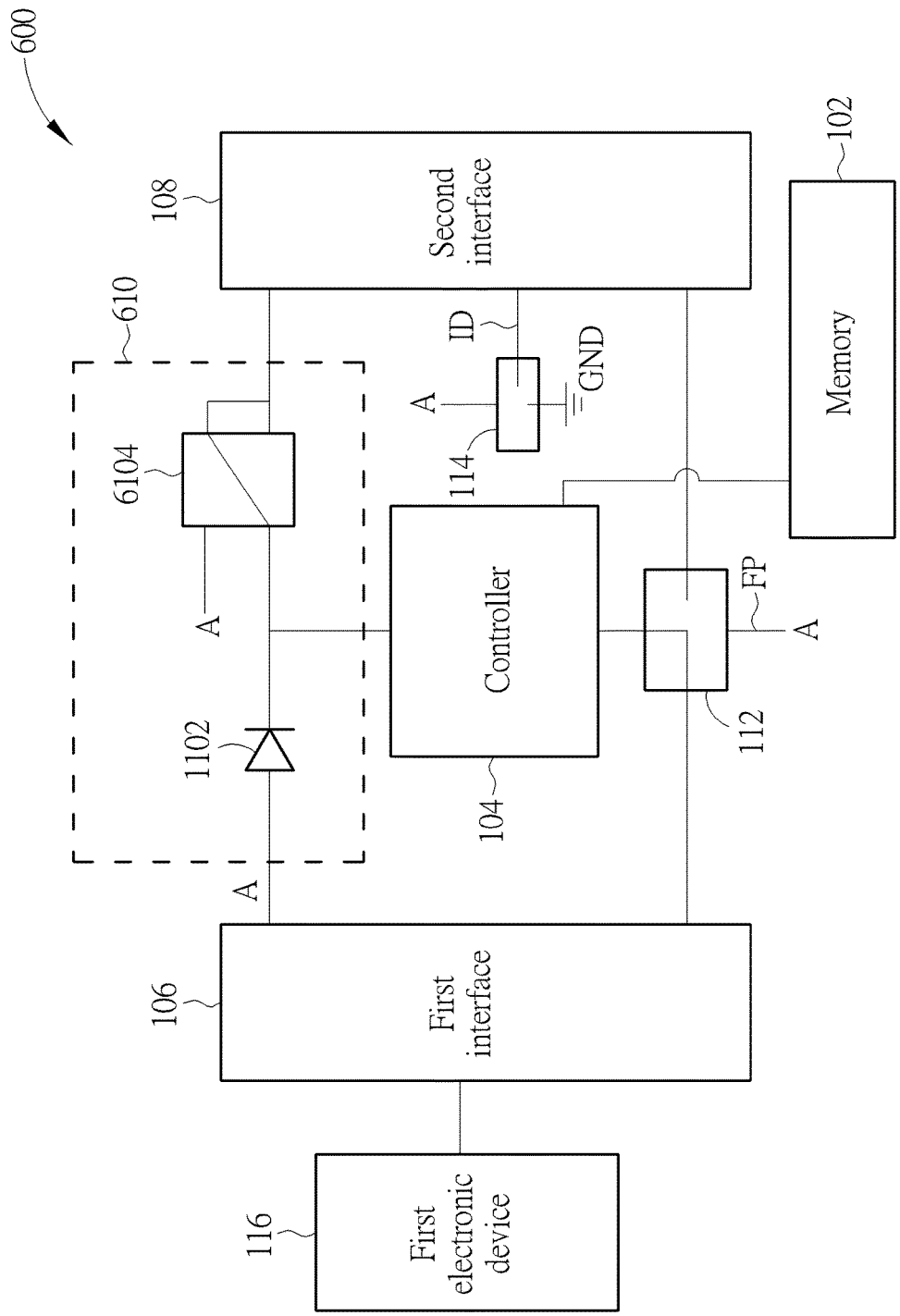
FIG. 7 is a diagram illustrating the first interface of the external storage device being electrically connected to the first electronic device.

Please refer to FIG. 7. FIG. 7 is a diagram illustrating the first interface 106 of the external storage device 600 being electrically connected to the first electronic device 116. As shown in FIG. 7, when the first interface 106 is electrically connected to the first electronic device 116 and the second interface 108 is not electrically connected to anything, the signal A of the anode of the first diode 1102 is high, so the first terminal of the third switching unit 6104 is electrically connected to the second terminal of the third switching unit 6104 according to the signal A of the anode of the first diode 1102, and the first terminal of the second switching module 112 is connected to the second terminal of the second switching module 112 according to the signal A of the anode of the first diode 1102. Meanwhile, the second interface 108 is not electrically connected to anything, so the predetermined pin ID of the second interface 108 is floating according to the signal A of the anode of the first diode 1102. But, the present invention is not limited to the signal A being high when the first interface 106 is electrically connected to the first electronic device 116 and the second interface 108 is not electrically connected to anything. Therefore, the first electronic device 116 can charge the controller 104 through the first diode 1102. In addition, because the first electronic device 116 charges the controller 104, the first electronic device 116 can access the memory 102 through the second switching module 112 and the controller 104. Therefore, as shown in FIG. 7, when the first interface 106 is electrically connected to the first electronic device 116 and the second interface 108 is not electrically connected to anything, the external storage device 600 is to be a storage device of the first electronic device 116.

Figure 8:
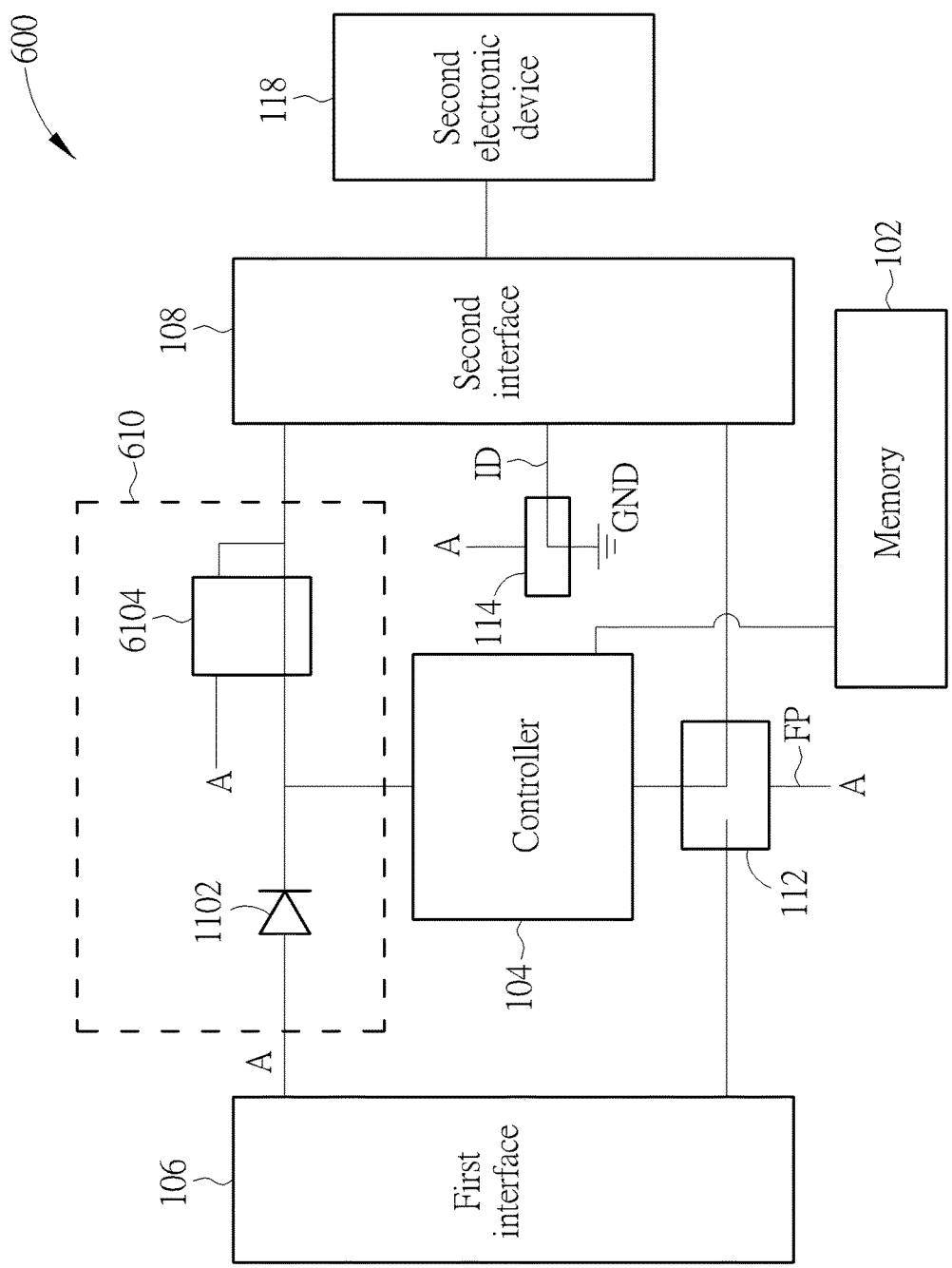
FIG. 8 is a diagram illustrating the second interface of the external storage device being electrically connected to the second electronic device.

Please refer to FIG. 8. FIG. 8 is a diagram illustrating the second interface 108 of the external storage device 600 being electrically connected to the second electronic device 118. As shown in FIG. 8, when the second interface 108 is electrically connected to the second electronic device 118 and the first interface 106 is not electrically connected to anything, the signal A of the anode of the first diode 1102 is low, so the first terminal of the third switching unit 6104 is electrically connected to the third terminal of the third switching unit 6104 according to the signal A of the anode of the first diode 1102, and the first terminal of the second switching module 112 is connected to the third terminal of the second switching module 112 according to the signal A of the anode of the first diode 1102. Therefore, the second electronic device 118 can charge the controller 104 through the third switching unit 6104. In addition, the first interface 106 is not electrically connected to anything, so the third switching module 114 connects to the predetermined pin ID of the second interface 108 to the ground GND according to the signal A of the anode of the first diode 1102. In addition, because the second electronic device 118 charges the controller 104, the second electronic device 118 can access the memory 102 through the second switching module 112 and the controller 104. Therefore, as shown in FIG. 8, when the second interface 108 is electrically connected to the second electronic device 118 and the first interface 106 is not electrically connected to anything, the external storage device 600 is to be a storage device of the second electronic device 118. That is to say, when the second interface 108 is electrically connected to the second electronic device 118 and the first interface 106 is not electrically connected to anything, the third switching module 114 connects to the predetermined pin ID of the second interface 108 to the ground GND, so the second electronic device 118 is a host and the external storage device 600 is to be a storage device of the second electronic device 118.

Figure 9:
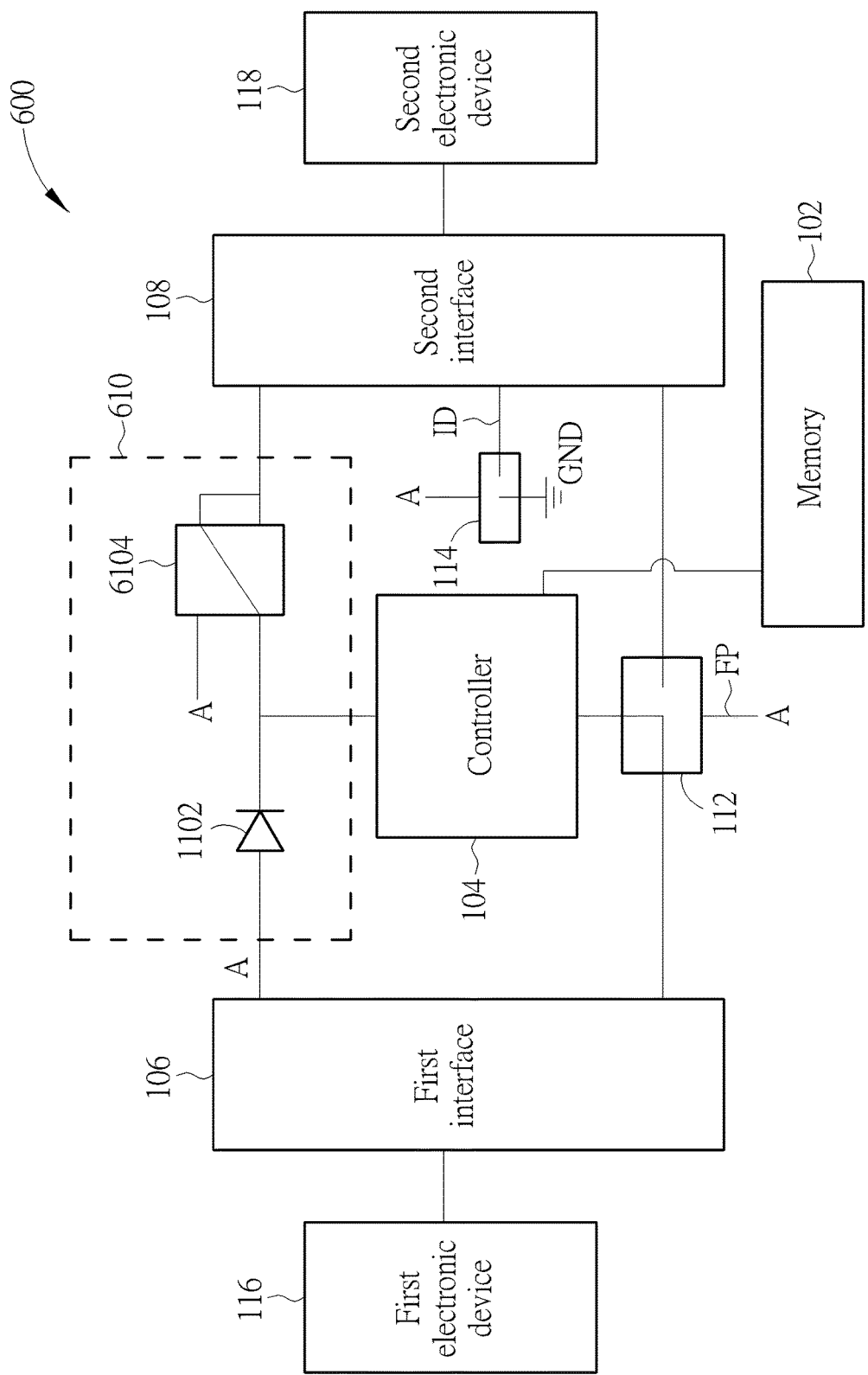
FIG. 9 is a diagram illustrating the first interface being electrically connected to the first electronic device and the second interface being electrically connected to the second electronic device.

Please refer to FIG. 9. FIG. 9 is a diagram illustrating the first interface 106 being electrically connected to the first electronic device 116 and the second interface 108 being electrically connected to the second electronic device 118. As shown in FIG. 9, when the first interface 106 is electrically connected to the first electronic device 116 and the second interface 108 is electrically connected to the second electronic device 118, the predetermined pin ID of the second interface 108 is floating according to the signal A of the anode of the first diode 1102. The signal A of the anode of the first diode 1102 is high, so the first terminal of the third switching unit 6104 is electrically connected to the second terminal of the third switching unit 6104 according to the signal A of the anode of the first diode 1102, and the first terminal of the second switching module 112 is connected to the second terminal of the second switching module 112 according to the signal A of the anode of the first diode 1102. Meanwhile, the first electronic device 116 can charge the controller 104 through the first diode 1102, and charge the second electronic device 118 through the first diode 1102 and the third switching unit 6104. In addition, because the first electronic device 116 charges the controller 104, the first electronic device 116 can access the memory 102 through the second switching module 112 and the controller 104. Therefore, as shown in FIG. 9, when the second interface 108 is electrically connected to the second electronic device 118 and the first interface 106 is electrically connected to the first electronic device 116, the external storage device 600 is to be a storage device of the first electronic device 116, and the first electronic device 116 can charge the second electronic device 118.

Figure 10:
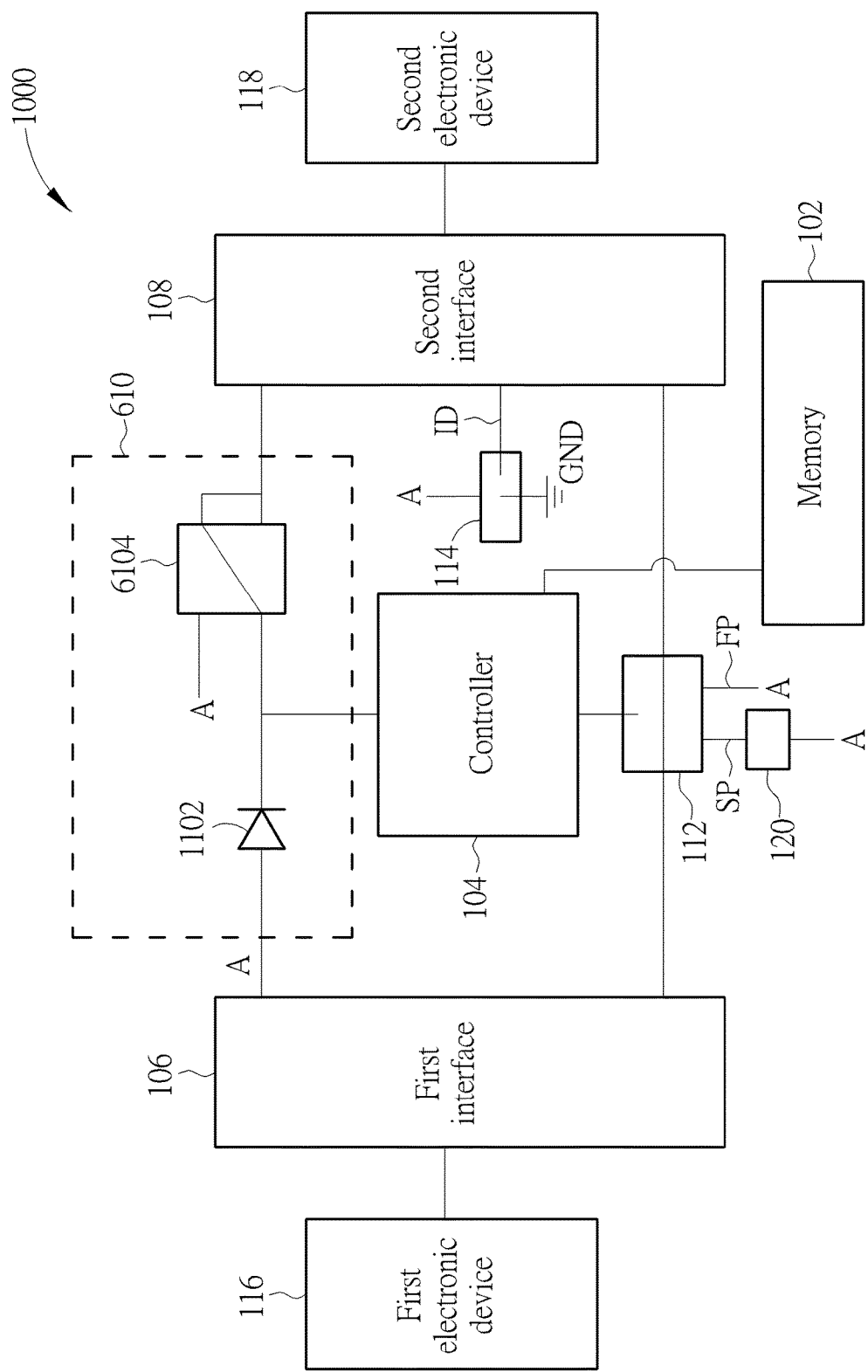
FIG. 10 is a diagram illustrating an external storage device according to another embodiment.

Please refer to FIG. 10. FIG. 10 is a diagram illustrating an external storage device 1000 according to another embodiment. As shown in FIG. 10, a difference between the external storage device 1000 and the external storage device 600 is that the external storage device 1000 further includes a fourth switching module 120, and the second switching module 112 further includes a second pin SP, wherein a first terminal of the fourth switching module 120 is coupled to the anode of the first diode 1102 for receiving a signal A of the anode of the first diode 1102, and a second terminal of the fourth switching module 120 is coupled to the second pin SP of the second switching module 112. As shown in FIG. 10, when the first interface 106 is electrically connected to the first electronic device 116 and the second interface 108 is electrically connected to the second electronic device 118, the fourth switching module 120 can transmit a signal A of the anode of the first diode 1102 to the second pin SP of the second switching module 112. Meanwhile, the signal A of the anode of the first diode 1102 is high (that is, signals of the first pin FP and the second pin SP of the second switching module 112 are all high), so the second terminal of the second switching module 112 is connected to the third terminal of the second switching module 112 according to the signal A of the anode of the first diode 1102, therefore the first electronic device 116 can access the second electronic device 118 and not access the memory 102 through the second switching module 112. In addition, because the first terminal of the third switching unit 6104 electrically connected to the second terminal of the third switching unit 6104 according to the signal A of the anode of the first diode 1102, the first electronic device 116 can charge the second electronic device 118 through the third switching unit 6104. In addition, subsequent operational principles of the external storage device 1000 are the same as those of the external storage device 600, so further description thereof is omitted for simplicity.

To sum up, compared to the prior art, the external storage device provided by the present invention has advantages as follows: first, when the first interface of the external storage device is electrically connected to the first electronic device and the second interface of the external storage device is electrically connected to the second electronic device, the first electronic device can access the external storage device or the second electronic device; second, when the first interface of the external storage device is electrically connected to the first electronic device and the second interface of the external storage device is electrically connected to the second electronic device, the first electronic device can charge the second electronic device regardless of the first electronic device accessing the external storage device or the second electronic device; third, the first electronic device does not need an additional cable when the first electronic device charges the second electronic device; and fourth, consumer products with two different type interfaces for the first electronic device and the second electronic device become more and more in the future, so the external storage device can be applied to the consumer products with two different type interfaces.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An external storage device, comprising:
   a memory;
   a controller coupled to the memory;
   a first interface used to connect to a first electronic device;
   a second interface used to connect to a second electronic device;
   a first switching module coupled to the controller, the first interface, and the second interface; and
   a second switching module coupled to the controller, the first interface, the second interface, and the first switching module;
   wherein only when the first interface is electrically connected to the first electronic device, the first electronic device charges the controller through the first switching module, and the first electronic device accesses the memory through the second switching module and the controller;
   wherein only when the second interface is electrically connected to the second electronic device, the second electronic device charges the controller through the first switching module, and the second electronic device accesses the memory through the second switching module and the controller;
   wherein when the first interface is electrically connected to the first electronic device and the second interface is electrically connected to the second electronic device, the first electronic device charges the controller and the second electronic device through the first switching module, and the first electronic device accesses the memory through the second switching module and the controller.

2. The external storage device of the claim 1, further comprising:
   a third switching module coupled to a predetermined pin of the second interface and the first switching module;
   wherein when both the first interface is electrically connected to the first electronic device and the second interface is electrically connected to the second electronic device, the predetermined pin of the second interface is floating.

3. The external storage device of the claim 1, wherein the first switching module comprises:
   a first diode having an anode coupled to the first interface, and a cathode;
   a second diode having an anode coupled to the second interface, and a cathode coupled to the cathode of the first diode;
   an AND gate having a first input terminal coupled to the anode of the first diode, a second input terminal coupled to the anode of the second diode, and an output terminal;
   a first switching unit having a first terminal coupled to the cathode of the first diode, a control terminal coupled to the output terminal of the AND gate, and a second terminal coupled to the controller, wherein when both the first interface is electrically connected to the first electronic device and the second interface is electrically connected to the second electronic device, the first terminal of the first switching unit is electrically connected to the second terminal of the first switching unit according to an output signal of the output terminal of the AND gate; and
   a second switching unit having a first terminal coupled to the cathode of the second diode, a second terminal coupled to the anode of the second diode, and a control terminal coupled to the output terminal of the AND gate, wherein when both the first interface is electrically connected to the first electronic device and the second interface is electrically connected to the second electronic device, the first terminal of the second switching unit is electrically connected to the second terminal of the second switching unit according to the output signal of the output terminal of the AND gate.

4. The external storage device of the claim 1, wherein the first switching module comprises:
   a first diode having an anode coupled to the first interface, and a cathode; and
   a third switching unit having a first terminal coupled to the cathode of the first diode, a second terminal coupled to the second interface, a third terminal coupled to the second interface, and a control terminal coupled to the anode of the first diode, wherein when both the first interface is electrically connected to the first electronic device and the second interface is electrically connected to the second electronic device, the first terminal of the third switching unit is electrically connected to the third terminal of the third switching unit according to a signal of the anode of the first diode.

5. The external storage device of the claim 1, wherein the second switching module is coupled to the first switching module and the first interface through a first pin.

6. The external storage device of the claim 1, wherein the memory is a flash memory.

7. The external storage device of the claim 1, wherein the first interface is a normal Universal Serial Bus (USB) interface and the second interface is a micro-USB interface.

8. The external storage device of the claim 1, wherein the first electronic device is a personal computer or a host that provides power.

9. The external storage device of the claim 1, wherein the second electronic device is a hand-held device or a portable device.

10. An external storage device, comprising:
    a memory;
    a controller coupled to the memory;
    a first interface used to connect to a first electronic device;
    a second interface used to connect to a second electronic device;
    a first switching module coupled to the controller, the first interface, and the second interface; and
    a second switching module coupled to the controller, the first interface, the second interface, and the first switching module;
    wherein only when the first interface is electrically connected to the first electronic device, the first electronic device charges the controller through the first switching module, and the first electronic device accesses the memory through the second switching module and the controller;
    wherein only when the second interface is electrically connected to the second electronic device, the second electronic device charges the controller through the first switching module, and the second electronic device accesses the memory through the second switching module and the controller;

wherein when the first interface is electrically connected to the first electronic device and the second interface is electrically connected to the second electronic device, the first electronic device charges the second electronic device through the first switching module, and the first electronic device accesses the second electronic device through the second switching module.

11. The external storage device of the claim 10, further comprising:

a third switching module coupled to a predetermined pin of the second interface and the first switching module;

wherein when both the first interface is electrically connected to the first electronic device and the second interface is electrically connected to the second electronic device, the predetermined pin of the second interface is floating.

12. The external storage device of the claim 10, wherein the first switching module comprises:

a first diode having an anode coupled to the first interface, and a cathode;

a second diode having an anode coupled to the second interface, and a cathode coupled to the cathode of the first diode;

an AND gate having a first input terminal coupled to the anode of the first diode, a second input terminal coupled to the anode of the second diode, and an output terminal;

a first switching unit having a first terminal coupled to the cathode of the first diode, a control terminal coupled to the output terminal of the AND gate, and a second terminal coupled to the controller, wherein when both the first interface is electrically connected to the first electronic device and the second interface is electrically connected to the second electronic device, the first terminal of the first switching unit is electrically connected to the second terminal of the first switching unit according to an output signal of the output terminal of the AND gate; and a second switching unit having a first terminal coupled to the cathode of the second diode, a second terminal coupled to the anode of the second diode, and a control terminal coupled to the output terminal of the AND gate, wherein when both the first interface is electrically connected to the first electronic device and the second interface is electrically connected to the second electronic device, the first terminal of the second switching unit is electrically connected to the second terminal of the second switching unit according to the output signal of the output terminal of the AND gate.

13. The external storage device of the claim 12, wherein the second switching module further comprises a second pin coupled to the anode of the second diode and the second interface, and the first switching unit further comprises a second control terminal coupled to the anode of the first diode and a third control terminal coupled to the anode of the second diode; wherein when the first interface is electrically connected to the first electronic device and the second interface is electrically connected to the second electronic device, the first terminal of the first switching unit is disconnected to the second terminal of the first switching unit according to the output signal of the output terminal of the AND gate, a signal of the anode of the first diode, and a signal of the anode of the second diode, the first electronic device accesses the second electronic device through the second switching module according to the signal of the anode of the first diode and the signal of the anode of the second diode, the first terminal of the second switching unit is electrically connected to the second terminal of the second switching unit according to the output signal of the output terminal of the AND gate, and the first electronic device charges the second electronic device through the second switching unit of the first switching module.

14. The external storage device of the claim 10, wherein the first switching module comprises:

a first diode having an anode coupled to the first interface, and a cathode; and a third switching unit having a first terminal coupled to the cathode of the first diode, a second terminal coupled to the second interface, a third terminal coupled to the second interface, and a control terminal coupled to the anode of the first diode, wherein when both the first interface is electrically connected to the first electronic device and the second interface is electrically connected to the second electronic device, the first terminal of the third switching unit is electrically connected to the second terminal of the third switching unit according to a signal of the anode of the first diode.

15. The external storage device of the claim 14, further comprising:

a fourth switching module having a first terminal coupled to the anode of the first diode, and a second terminal coupled to a second pin of the second switching module;

wherein when the first interface is electrically connected to the first electronic device and the second interface is electrically connected to the second electronic device, the fourth switching module transmits a signal of the anode of the first diode to the second pin of the second switching module, and the first electronic device accesses the second electronic device through the second switching module according to the signal of the anode of the first diode.

16. The external storage device of the claim 10, wherein the second switching module is coupled to the first switching module and the first interface through a first pin.

17. The external storage device of the claim 10, wherein the memory is a flash memory.

18. The external storage device of the claim 10, wherein the first interface is a normal Universal Serial Bus (USB) interface and the second interface is a micro-USB interface.

19. The external storage device of the claim 10, wherein the first electronic device is a personal computer or a host that provides power.

20. The external storage device of the claim 10, wherein the second electronic device is a hand-held device or a portable device.

* * * * *